United States Patent [19]

van Beek

[11] Patent Number: 4,946,423
[45] Date of Patent: Aug. 7, 1990

[54] INFINITELY VARIABLE TRANSMISSION
[75] Inventor: Coenraad H. van Beek, Diessen, Netherlands
[73] Assignee: Van Doorne's Transmissie B.V., Tilburg, Netherlands
[21] Appl. No.: 295,095
[22] Filed: Jan. 9, 1989
[30] Foreign Application Priority Data Feb. 10, 1988 [NL] Netherlands ............... 8800315

[51] Int. Cl.$^5$ ............................................. F16H 9/04
[52] U.S. Cl. ......................................... 474/25; 474/28
[58] Field of Search ..................... 474/11, 12, 16, 17, 474/18, 28, 69, 70; 74/866–869

[56] References Cited

U.S. PATENT DOCUMENTS 4,369,675  1/1983  van Deursen ............... 474/28 X
4,552,545  11/1985 Koivunen ..................... 474/16
4,575,364  3/1986  Lamers ......................... 474/16

FOREIGN PATENT DOCUMENTS 2118083  9/1989  Fed. Rep. of Germany .

Primary Examiner—Thuy M. Bui
Attorney, Agent, or Firm—Pennie & Edmonds

[57] ABSTRACT

In an infinitely variable transmission with discs (1, 2) the movable disc (2) is connected to a cylinder wall (11), which together with a piston (3) encloses a fluid filled cylinder space (4). A sealing ring (6, 15, 17) provides one or more calibrated openings (14, 16) between the piston and the cylinder wall, so that as a result of the continuous relative movement, between the piston with sealing ring and the cylinder wall, during actuation of the transmission the calibrated openings are automatically scraped clean.

4 Claims, 2 Drawing Sheets

INFINITELY VARIABLE TRANSMISSION

FIELD OF THE INVENTION

The invention relates to an infinitely variable transmission provided with an endless transmission belt running on V-shaped pulley, at least one half of the pulley displaceable in the axial direction by, and under the control of a hydraulic cylinder-unit. The hydraulic cylinder unit is provided with a pressure compensation chamber for compensating pressure increases in the cylinder space as a result of centrifugal forces, which pressure compensation chamber can be supplied with fluid from the cylinder space via at least one filling hole.

BACKGROUND OF THE INVENTION

Such an infinitely variable transmission is e.g. known from the German Offenlegungsschrift No. 2118083. The limitation of the filling hole used there is that, in order to be able to ensure that there is constantly sufficient pressure in the cylinder space, the filling hole cannot be too large because otherwise, especially at higher pressures, too much fluid will flow away via the filling hole in the compensation chamber. The drawback of too small a hole on the other hand is that the filling hole becomes clogged easily, so that the action of the compensation chamber is limited or lost entirely. This drawback has largely been obviated in a steplessly variable transmission according to the Dutch patent application No. 8302089, the disclosure of which is also available in U.S. Pat. No. 4,575,364 to Lamers. This known infinitely variable transmission is also provided with a filling hole as described above but before this filling hole, at the side of the cylinder space, a filter is provided. This filter has a number of passages which together form a considerably larger passage diameter than that of the filling hole, the diameter of each passage being smaller than that of the filling hole, however. The infinitely variable transmission with a filling hole provided with a filter functions well by itself, but its drawback is that after a long time rather a great deal of impurities is collected in the cylinder space and before the filter, which impurities restrict the proper functioning in the long run. Moreover, such a filter is relatively expensive. The purpose of the invention is to obviate the above drawbacks of the known infinitely variable transmission.

SUMMARY OF THE INVENTION

According to the invention the infinitely variable transmission of the kind described in the preamble is characterized in that the filling hole is formed by one or more calibrated openings between the piston and one wall of the cylinder.

Such a calibrated opening can be adjusted such that under all circumstances a sufficient supply of fluid, that is, a leakage flow, is ensured towards the pressure compensation chamber. Small impurities can pass the calibrated opening and will eventually end up, via the pressure compensation chamber, in a sump of the transmission, from where the impurities are stopped by a filter and can no longer be circulated in the system. The larger impurities, which are especially produced when the transmission is running in, usually cannot pass the calibrated opening but cannot clog the calibrated opening either because of the continuous relative movement of the piston and cylinder, so that the calibrated opening is constantly scraped clean as it were. The life of the transmission is considerably extended as a result, whilst interim cleaning of the calibrated openings is not necessary.

According to a preferential embodiment of the invention the calibrated opening is formed by a relief in a surface of a sealing member provided between the piston and the wall of the cylinder. The sealing member may e.g. be a rectangular sealing ring, such as a piston ring. The sealing ring thereby ensures that the pressure in the cylinder space is always sufficiently a sufficient leakage flow towards the compensation chamber is ensured by the relief in the sealing ring. This dual function of the sealing ring forms a simple and at the same time inexpensive construction for the filling hole.

BRIEF DESCRIPTION OF THE DRAWINGS

The invention will now be further explained with reference to an embodiment and a drawing. In the drawing.

DESCRIPTION OF THE PREFERRED EMBODIMENTS

Figure 1:
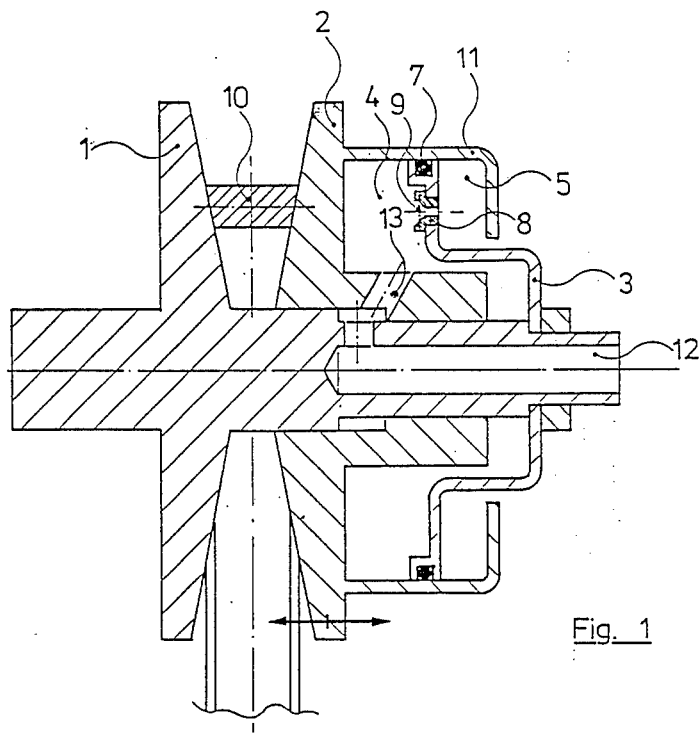
FIG. 1 shows a pulley of an infinitely variable transmission according to the Lamers patent, with a filling hole between a cylinder and a compensation chamber, said filling hole being provided with a filter.

On a combined shaft and pulley-half 1 of a V-shaped pulley according to FIG. 1 there is mounted an axially movable, yet rotatable, opposed pulley-half 2. The pulley-half 2 is integrally connected to a cylinder wall 11 which extends co-axially about the axis of the shaft and pulley-half combination 1 and encloses a cylindrical chamber 4. One end of the cylindrical 4 is closed by a piston 3 which is sealed against the cylinder wall 11 by means of a sealing ring 7. Pressurized fluid is carried to the cylindrical chamber 4 by bores 12 and 13, so that the chamber is pressurized. As a result of this a gripping force is produced on an endless driving belt 10 located between the pulley-halves 1 and 2. Fluid flows into a compensation chamber 5 through a filling hole 8 in the piston 3, said filling hole 8 being provided with a filter plug 9. The filling hole 8 is dimensioned such that the pressure in the compensation chamber 5 is substantially only the result of centrifugal forces on rotation of the pulley. Said pressure in the compensation chamber 5 results in a decrease of the gripping force and therefore compensates at least partially the extra pressure built up by the centrifugal effect in the cylindrical chamber 4. The filling hole cannot become clogged because the filter of the plug 9 will stop impurities. In the long run, however, excessive impurities will collect in the cylindrical chamber 4, as a result of which proper operation of the cylinder-piston system may be impeded considerably. Cleaning or replacement will then be necessary.

Figure 2:
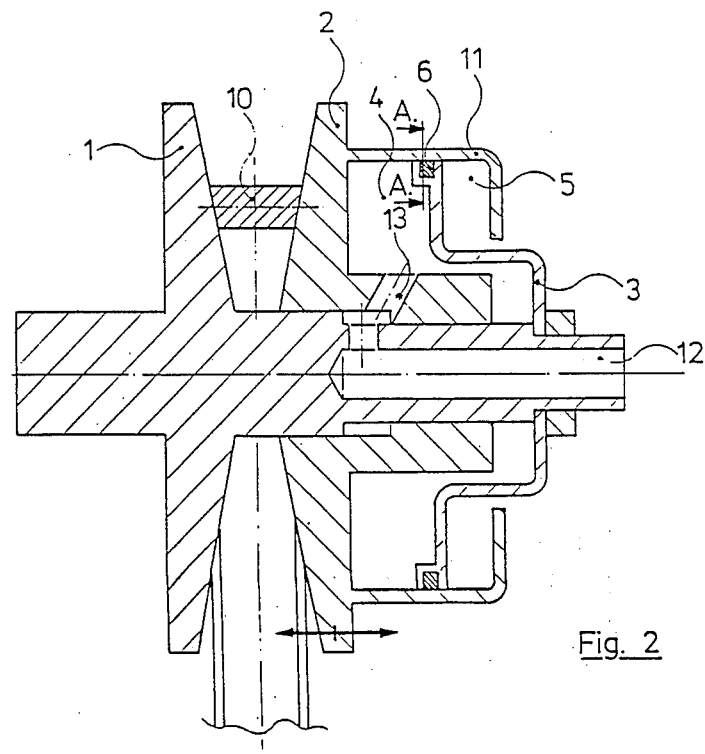
FIG. 2 shows a pulley of an infinitely variable transmission according to the invention, with a calibrated opening between the cylinder wall and the piston.

FIG. 2 illustrates an embodiment of a V-shaped pulley according to the invention. In FIG. 2 corresponding parts with a corresponding action are indicated by the same reference numbers used in FIG. 1.

Figure 3:
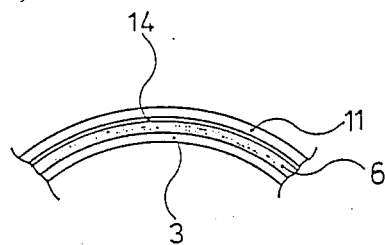
FIG. 3 is a section according to the line A—A in FIG. 2.

The main difference between the known infinitely variable transmission according to FIG. 1 and the one according to FIG. 2 is that in the embodiment according to the invention the costly and in the long run not quite satisfactory filling hole 8 provided with a filter plug is replaced by a filling hole consisting of a calibrated opening between the cylinder wall 11 and the piston 3. In this case a sealing ring 6 is provided between the piston 3 and the cylinder wall 11, whereby such a circular calibrated opening 14 (FIG. 3) is present between the sealing ring 6 and the cylinder wall 11, such that under all circumstances a sufficient supply of fluid to the compensation chamber 5 is ensured, while a sufficient filling of the cylindrical chamber 4 is also ensured at all times because an excess of fluid cannot flow to the compensation chamber, not even at high pressures. Such a calibrated opeining is moreover self-cleaning as a result of the continuous relative movement between the piston 3 the sealing ring 6 and the cylinder wall 11, so that the calibrated opening 14 forming the filling hole is constantly scraped clean.

Figure 4:
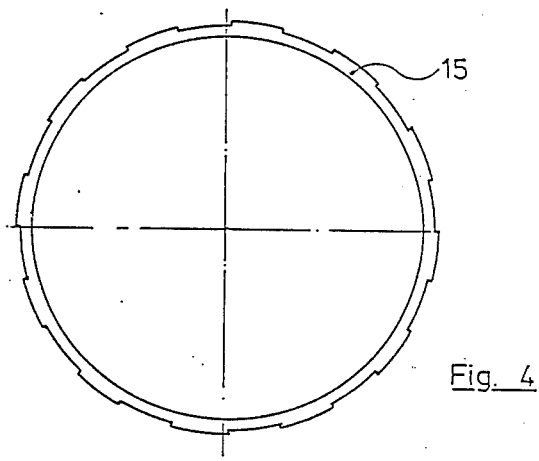
FIG. 4 is a special embodiment of a sealing ring.
Figure 5:
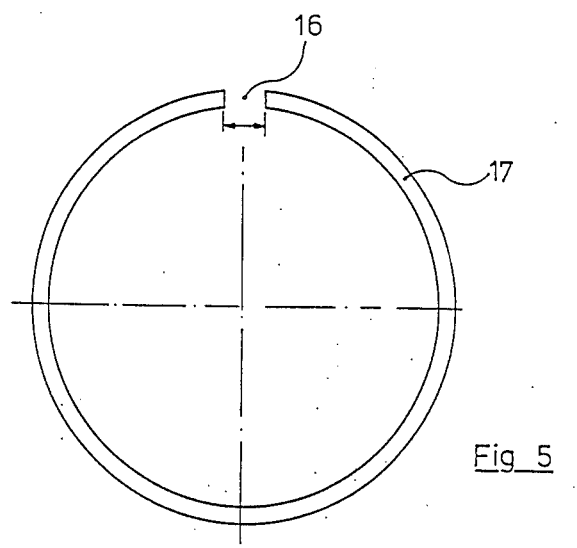
FIG. 5 is another special embodiment of the sealing ring.

The sealing ring 6 and the cylinder wall may also enclose several small calibrated openings instead of one circular calibrated opening 14 (FIG. 4). This is e.g. possible by means of a sealing ring 15 which butts against the cylinder wall 15 over a number of radial sectors but is relieved therefrom over other radial sectors. Furthermore the calibrated opening may also be formed by an opening 16 between the ends of a cut-through sealing ring 17 (FIG. 5).

The sealing rings may be made of several materials known by themselves, such as plastic material, cast iron and ceramic material. It will also be possible hereby to make advantageous use of a piston ring known by itself.

It will be apparent that the invention has not been described exhaustively with reference to the embodiments and the drawing and that several modifications will be obvious to a person skilled in the art. Such modifications are considered to fall within the scope of the invention.

I claim:

1. An infinitely variable transmission, comprising:
   an endless transmission belt;
   at least one V-shaped pulley, comprising two pulley-halves axially movable with respect to one another, between opposed faces of which said belt is confined;
   a hydraulic cylinder and piston combination connected to at least a first pulley-half of the V-shaped pulley for displacing the first pulley-half in an axial direction, the cylinder defining a cylindrical chamber within which said piston moves axially;
   means to supply hydraulic fluid under pressure to said cylindrical chamber;
   a pressure compensation chamber communicating with the cylindrical chamber;
   wherein said piston and cylinder are formed to define a calibrated opening between a radially outer surface of the piston and a wall of the cylindrical chamber, to control the flow of fluid from the cylindrical chamber to the pressure compensation chamber.

2. An infinitely variable transmission as recited in claim 1, wherein the calibrated opening is defined by a space between a sealing ring carried between the piston and the wall of the cylindrical chamber.

3. An infinitely variable transmission as recited in claim 1, wherein the sealing ring butts against the cylinder wall over a number of spaced radial sectors and is relieved therefrom over the remaining radial sectors to define calibrated openings between the relieved sectors and the cylinder wall.

4. An infinitely variable transmission as recited in claim 2, wherein the calibrated opening is defined by a sealing ring carried between the piston and the wall of the cylinder, the sealing ring not defining a complete circle such that it includes ends spaced from one another, the space therebetween defining the calibrated opening.

* * * * *